United States Patent
Pistoia et al.

(10) Patent No.: US 8,881,300 B2
(45) Date of Patent: *Nov. 4, 2014

(54) AUTOMATED DETECTION OF FLAWS AND INCOMPATIBILITY PROBLEMS IN INFORMATION FLOW DOWNGRADERS

(71) Applicant: International Business Machines Corporation, Armonk, NY (US)

(72) Inventors: Marco Pistoia, Amawalk, NY (US); Takaaki Tateishi, Kanagawa (JP); Stephen D. Teilhet, Milford, NH (US); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,962

(22) Filed: Mar. 5, 2013

(65) Prior Publication Data

US 2013/0179978 A1    Jul. 11, 2013

Related U.S. Application Data

(63) Continuation of application No. 13/248,724, filed on Sep. 29, 2011, now Pat. No. 8,769,696.

(51) Int. Cl.
| | |
|---|---|
| *G06F 7/04* | (2006.01) |
| *G06F 17/30* | (2006.01) |
| *H04N 7/16* | (2011.01) |
| *G06F 21/00* | (2013.01) |
| *G06F 21/57* | (2013.01) |

(52) U.S. Cl.
CPC .............. *G06F 21/577* (2013.01); *G06F 21/00* (2013.01)
USPC .............................................. 726/26; 380/33

(58) Field of Classification Search
USPC .......................................................... 726/26
See application file for complete search history.

(56) References Cited

U.S. PATENT DOCUMENTS

| | | | |
|---|---|---|---|
| 7,240,332 | B2 | 7/2007 | Berg et al. |
| 7,293,175 | B2 | 11/2007 | Brown et al. |

(Continued)

FOREIGN PATENT DOCUMENTS

| | | |
|---|---|---|
| EP | 0 510 241 A2 | 10/1992 |
| JP | 2011013810 | 1/2011 |
| WO | WO 2008/047351 A2 | 4/2008 |

OTHER PUBLICATIONS

Office Action mailed Jul. 19, 2013 for U.S. Appl. No. 13/248,724; 15 pages.

(Continued)

*Primary Examiner* — Philip Chea
*Assistant Examiner* — Monjour Rahim
(74) *Attorney, Agent, or Firm* — Stpehen J. Walder, Jr.; Jeffrey S. LaBaw

(57) ABSTRACT

Mechanisms for evaluating downgrader code in application code with regard to a target deployment environment. Downgrader code in the application code is identified. Based on an input string, an output string that the downgrader code outputs in response to receiving the input string is identified. One or more sets of illegal string patterns are retrieved. Each of the one or more sets of illegal string patterns is associated with a corresponding deployment environment. The illegal string patterns are string patterns that a downgrader identifies in the information flow for security purposes. A determination is made as to whether the downgrader code is compatible with the target deployment environment based on the one or more sets of illegal string patterns and the output string. An output indicative of the results of the determining is generated.

11 Claims, 6 Drawing Sheets

(56) References Cited

U.S. PATENT DOCUMENTS

| | | | |
|---|---|---|---|
| 7,392,545 | B1 | 6/2008 | Weber et al. |
| 7,398,516 | B2 | 7/2008 | Berg et al. |
| 7,398,517 | B2 | 7/2008 | Berg et al. |
| 7,475,431 | B2 | 1/2009 | Chao |
| 7,530,101 | B2 | 5/2009 | Gallo et al. |
| 7,530,107 | B1 | 5/2009 | Ono et al. |
| 7,617,489 | B2 | 11/2009 | Peyton et al. |
| 7,661,097 | B2 | 2/2010 | Mukkavilli |
| 7,849,509 | B2 | 12/2010 | Venkatapathy et al. |
| 7,937,692 | B2 | 5/2011 | Drepper |
| 7,975,257 | B2 | 7/2011 | Fanning et al. |
| 7,987,451 | B1 | 7/2011 | Dalcher |
| 8,104,021 | B2 | 1/2012 | Erlingsson et al. |
| 8,365,281 | B2 | 1/2013 | Tateishi et al. |
| 8,381,199 | B2 | 2/2013 | Tateishi et al. |
| 8,468,605 | B2 | 6/2013 | Haviv et al. |
| 2002/0073313 | A1 | 6/2002 | Brown et al. |
| 2003/0051054 | A1 | 3/2003 | Redlich et al. |
| 2004/0260940 | A1 | 12/2004 | Berg et al. |
| 2005/0108562 | A1 | 5/2005 | Khazan et al. |
| 2006/0005019 | A1 | 1/2006 | Chao |
| 2006/0150160 | A1 | 7/2006 | Taft et al. |
| 2006/0277539 | A1 | 12/2006 | Amarasinghe et al. |
| 2007/0016894 | A1 | 1/2007 | Sreedhar et al. |
| 2007/0083933 | A1 | 4/2007 | Venkatapathy et al. |
| 2007/0088740 | A1 | 4/2007 | Davies et al. |
| 2007/0094646 | A1 | 4/2007 | Higham |
| 2007/0107046 | A1 | 5/2007 | Jaeger et al. |
| 2007/0113292 | A1 | 5/2007 | Kao et al. |
| 2007/0150869 | A1 | 6/2007 | Tateishi et al. |
| 2007/0285271 | A1 | 12/2007 | Erlingsson et al. |
| 2008/0244536 | A1 | 10/2008 | Farchi et al. |
| 2008/0270993 | A1 | 10/2008 | Tateishi et al. |
| 2009/0138729 | A1 | 5/2009 | Hashimoto et al. |
| 2009/0193492 | A1 | 7/2009 | Banerjee et al. |
| 2011/0072517 | A1 | 3/2011 | Tripp |
| 2011/0087892 | A1 | 4/2011 | Haviv et al. |
| 2011/0088023 | A1 | 4/2011 | Haviv et al. |
| 2011/0131656 | A1 | 6/2011 | Haviv et al. |
| 2011/0145785 | A1 | 6/2011 | Centonze et al. |
| 2011/0185345 | A1 | 7/2011 | Swamy et al. |
| 2011/0321016 | A1 | 12/2011 | Haviv et al. |
| 2012/0023486 | A1 | 1/2012 | Haviv et al. |
| 2012/0084761 | A1 | 4/2012 | Maeda et al. |
| 2012/0131669 | A1 | 5/2012 | Tateishi et al. |
| 2012/0159619 | A1 | 6/2012 | Berg et al. |

OTHER PUBLICATIONS

Office Action mailed Sep. 6, 2013 for U.S. Appl. No. 13/248,724, 15 pages.
Terauchi, Tachio, "Secure Information Flow as a Safety Problem", University of California, Berkeley, Jun. 2005, pp. 1-16.
International Search Report and Written Opinion dated Feb. 1, 2012 for International Application No. PCT/EP2011/069155, 12 pages.
USPTO U.S. Appl. No. 12/575,647, Mar. 21, 2013, 2 pages.
USPTO U.S. Appl. No. 12/627,351, Mar. 21, 2013, 2 pages.
USPTO U.S. Appl. No. 12/825,293, Mar. 21, 2013, 2 pages.
USPTO U.S. Appl. No. 12/907,974; Mar. 21, 2013, 2 pages.
USPTO U.S. Appl. No. 12/950,432; 1 page.
USPTO U.S. Appl. No. 12/968,646, Mar. 21, 2013, 2 pages.
USPTO U.S. Appl. No. 13/248,724, Mar. 21, 2013, 2 pages.
USPTO U.S. Appl. No. 13/804,362, Mar. 21, 2013, 1 page.
Baldwin, Doug, "Constructing Regular Expressions from DFAs", SUNY Geneseo Department of Computer Science, Sep. 2006, http://www.cs.geneseo,edu/~baldwin/csci342/fall2006/0919dfa2re.html, 5 pages.
Bracewell, Tom, "Raytheon Secure Systems and Networks—Addressing the Challenge of Information Warfare", Raytheon Technology Today, Issue 2, 2007, pp. 4-39.
Christensen, Aske S. et al., "Precise Analysis of String Expressions", SAS'03, Proceedings of the International Static Analysis Symposium, vol. 2694 of LNCS, Jun. 2003, http://www.brics.dk/~amoeller/papers/strings/strings.pdf, 17 pages.
Clarke, Edmund M. et al., "Model Checking", The MIT Press, XP002667219, 1999, 1 page.
Cytron, Ron et al., "Efficiently Computing Static Single Assignment Form and the Control Dependence Graph", ACM Transactions on Programming Languages and Systems, vol. 13, No. 4, Oct. 1991, pp. 451-490.
Deyle, Travis et al., "PowerPACK: A Wireless Power Distribution System for Wearable Devices", IEEE, 2008, pp. 91-98.
Elgaard, Jacob et al., "MONA 1.x: New Techniques for WS1S and WS2S", Computer Aided Verification, Lecture Notes in Computer Science, vol. 1427/1998, 10th International Conference, CAV'98, Jun. 28-Jul. 2, 1998, http://www.brics.dk/mona/papers/mona1x-new-technique-ws1s-ws2s/article.pdf, pp. 516-520.
Engelfriet, Joost et al., "MSO definable string transductions and two-way finite state transducers", Leiden University, The Netherlands, Institute of Computer Science, Technical Report 98-13, Dec. 1998, 62 pages.
Frankel, S. et al., "IP Security (IPsec) and Internet Key Exchange (IKE) Document Roadmap (RFC6071)", ipcom.com, IPCOM000203905D, Feb. 1, 2011, 127 pages.
Grove, David et al., "A Framework for Call Graph Construction Algorithms", ACM Transactions on Programming Languages and Systems, vol. 23, No. 6, Nov. 2001, pp. 685-746.
Harvey, James D., "A Static Secure Flow Analyzer for a Subset of Java", US Naval Post-Graduate School, Mar. 1998, http://oai.dtic.mil/oai/oai?verb=getRecord&metadataPrefix=html&identifier=ADA343709, See Abstract: p. 6, 98 pages.
Henriksen, Jesper G. et al., "MONA: Monadic Second-Order Logic in Practice", Basic Research in Computer Science, BRICS Report Series, http://www.brics.dk/RS/95/21/BRICS-RS-95-21.pdf, May 1995, 20 pages.
Klarlund, Nils et al., "MONA Version 1.4 User Manual", Basic Research in Computer Science, University of Aarhus, Denmark, Jan. 2001, 83 pages.
Kong, Deguang et al., "ISA: A Source Code Static Vulnerability Detection System Based on Data Fusion", Conference Infoscale, Jun. 6-8, 2007, 7 pages.
Landwehr, C.E. et al., "Architecture and Components for Data Management Security: NRL Perspective", Naval Research Laboratory, Center for High Assurance Computer Systems, Code 5542, Washington, D.C., 2007-2008, 6 pages.
Libkin, Leonid, "Elements of Finite Model Theory", Springer, XP002667220, Section 7.4, 2004, 2 pages.
Livshits, V. B. et al., "Finding Security Vulnerabilities in Java Applications with Static Analysis", 14th USENIX Security Symposium, Jan. 1, 2005, 16 pages,
Livshits, Benjamin, "Improving Software Security with Precise Static and Runtime Analysis", Dissertation submitted to the Department of Computer Science and the Committee on Graduate Studies of Stanford University in partial fulfillment of the requirements for the degree of doctor of philosophy, Nov. 2006, 250 pages.
Minamide, Yasuhiko, "Static Approximation of Dynamically Generated Web Pages", Proceedings of the 14th International Conference on World Wide Web (WWW05), May 10-14, 2005, pp. 432-441.
Mohri, Mehryar et al., "Regular Approximation of Context-Free Grammars Through Transformation", in Jean-Claude Junqua and Gertjan van Noord, editors, Robustness in Language and Speech Technology, Dordrecht, 2001, 14 pages.
Moller, Anders et al., "The Pointer Assertion Logic Engine", Procs. of ACM SIGPLAN 2001 Conference on Programming Language Design and Implementation, 2001, pp. 1-11.
Pietraszek, Tadeusz et al., "Defending against Injection Attacks through Context-Sensitive String Evaluation", Lecture Notes in Computer Science (including subseries Lecture Notes in Artificial Intelligence and Lecture Notes in Bioinformatics), vol. 3858 LNCS (2006), 26 pages, Recent Advances in Intrusion Detection—8th International Symposium, RAID (2005), Revised.
Reps, Thomas, "Program Analysis via Graph Reachability", University of Wisconsin, Technical Report #1386, Aug. 1998, pp. 1-31.

(56) References Cited

OTHER PUBLICATIONS

Roscoe, A.W. et al., "What is intransitive noninterference?", Proceedings of the 1999 IEEE Computer Security Foundations Workshop, 1999, 11 pages.
Rosen, B.K. et al., "Global value numbers and redundant computations", Procs of 15th ACM SIGACT-SIGPLAN Symposium on Principles of Programming Languages, Jan. 1988, 16 pages.
Totseva, Silvia M., "Provision of Seamless Web Services in a Multi-level Security Environment", A Graduate Research Report Submitted for IMAT 670 in Partial Fulfillment of the Requirements for the Degree of Master of Science in Information Technology, University of Maryland University College—Europe, May 2009, 43 pages.
Tripp, Omer et al., "TAJ: Effective Taint Analysis of Web Applications", Proceedings of the 2009 ACM SIGPLAN Conference on Programming Language Design and Implementation (PLDI'09), Jun. 15-20, 2009; 11 pages.
Wassermann, Gary et al., "Sound and Precise Analysis of Web Applications for Injection Vulnerabilities", ACM, PLDI'07, Jun. 11-13, 2007, pp. 32-41.
Wassermann, Gary et al., "Static Detection of Cross-Site Scripting Vulnerabilities", ACM, ICSE'08, May 10-18, 2008, pp. 171-180.
Yu, Fang et al., "String Analysis", Available at http://citeseerx.ist.psu.edu/viewdoc/surnmary?doi=10.1.1,84.3591, 2008, 15 pages.
International Search Report and Written Opinion dated Jan. 17, 2013 for International Application No. PCT/IB2012/053856, 9 pages.
Notice of Allowance mailed Oct. 11, 2013 for U.S. Appl. No. 13/804,362; 24 pages.
Notice of Allowance mailed Oct. 16, 2013 for U.S. Appl. No. 12/968,646; 29 pages.
Response to Office Action filed with the USPTO on Dec. 3, 2013 for U.S. Appl. No. 13/248,724, 26 pages.
Bieber, P et al., "The PACAP Prototype: A Tool for Detecting Java Card Illegal Flow", Springer, Lecture Notes in Computer Science, 2001, pp. 25-37.
Bossi, Annalisa et al., "Modelling Downgrading in Information Flow Security", Proceedings of the 17th IEEE Computer Security Foundations Workshop (CSFW '04), 2004, 17 pages.
Chapman, Roderick et al., "Enforcing Security and Safety Models with an Information Flow Analysis Tool", SIGAda '04, Nov. 14-18, 2004, pp. 39-45.
Chong, Stephen et al., "Security Policies for Downgrading", CCS '04, Oct. 25-29, 2004, pp. 198-209.
Chong, Stephen et al., "SIF: Enforcing Confidentiality and Integrity in Web Applications", 16th USENIX Security Symposium, USENIX Association, 2007, 17 pages.
Denning, Dorothy E., "A Lattice Model of Secure Information Flow", ACM, 1976, pp. 236-243.
Denning, Dorothy E. et al., "Data Security", ACM 1979, pp. 227-249.
Focardi, Riccardo et al., "The Compositional Security Checker: A Tool for the Verification of Information Flow Security Properties", IEEE, vol. 23, No. 9, Sep. 1997, pp. 550-571.
Ghindici, Dorina et al., "On Practical Information Flow Policies for Java-Enabled Multiapplication Smart Cards", IFIP International Federation for Information Processing, 2008, pp. 32-47.
Hammer, Christian et al., "Flow-sensitive, context-sensitive, and obect-sensitive information flow control based on program dependence graphs", Springer, 2009, pp. 399-422.
Herrmann, Peter, "Information Flow Analysis of Component-Structured Applications", Proceedings 17th Annual Computer Security Applications Conference, 2001, 12 pages.
Li, Peng et al., "Downgrading Policies and Relaxed Noninterference", POPL '05, Jan. 12-14, 2005, 13 pages.
Li, Peng et al., "Practical Information-flow Control in Web-based Information Systems", Proceedings of the 18th IEEE Computer Security Foundations Workshop (CSFW '05), 2005, 14 pages.
Mantel, Heiko, "Information Flow Control and Applications—Bridging a Gap", Springer, 2001, pp. 153-172.
Myers, Andrew C. et al., "A Decentralized Model for Information Flow Control", ACM, 1997, pp. 129-142.
Myers, Andrew C., "JFlow: Practical Mostly-Static Information Flow Control", POPL, 1999, pp. 228-241.
Myers, Andrew C. et al., "Protecting Privacy Using the Decentralized Label Model", ACM 2001, pp. 410-442.
Roy, Indrajit et al., "Laminar: Practical Fine-Grained Decentralized Information Flow Control", PLDI '09, Jun. 15-20, 2009. pp. 63-74.
Sabelfeld, Andrei et al., "Language-Based Information-Flow Security", IEEE Journal on Selected Areas in Communications, vol. 21, No, 1, Jan. 2003, pp. 5-19.
Shankar, Umesh et al., "Toward Automated Information-Flow Integrity Verification for Security-Critical Applications", in Proceedings of the 2006 ISOC Networked and Distributed Systems Security Symposium (NDSS 2006), 16 pages.
Smith, Scott F. et al., "Refactoring Programs to Secure Information Flows", PLAS '06, Jun. 10, 2006, pp. 75-84.
Smith, Geoffrey et al., "Secure Information Flow in a Multi-threaded Imperative Language", POPL 1998, pp. 355-364.
Zeldovich, Nickolai et al., "Security Distributed Systems with Information Flow Control", NSDI 2008, 5th USENIX Symposium on Networked Systems Design and Implementation, pp. 293-308.

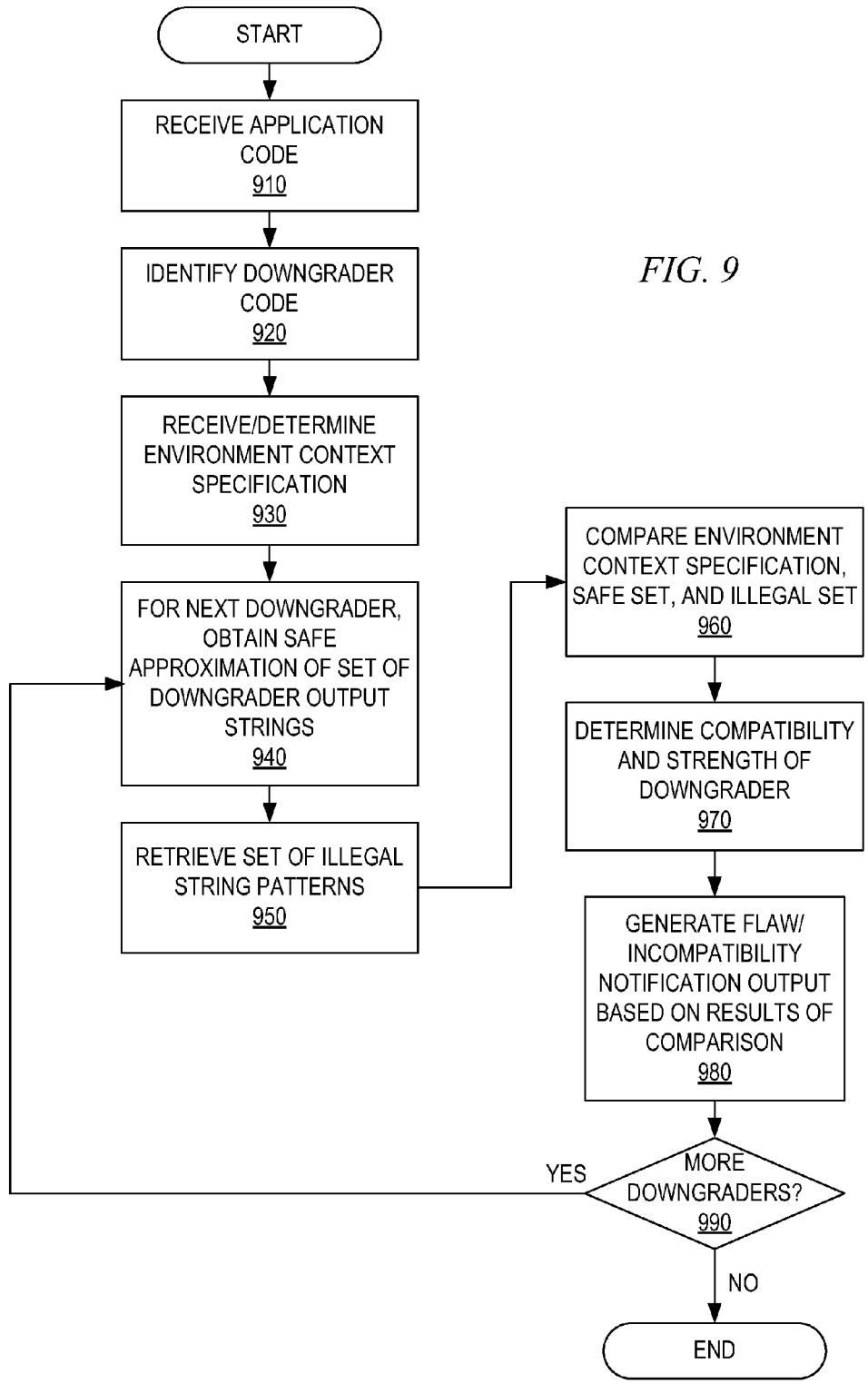

AUTOMATED DETECTION OF FLAWS AND INCOMPATIBILITY PROBLEMS IN INFORMATION FLOW DOWNGRADERS

This application is a continuation of application Ser. No. 13/248,724, filed Sep. 29, 2011, status pending.

BACKGROUND

The present application relates generally to an improved data processing apparatus and method and more specifically to mechanisms for automated detection of flaws and incompatibility problems in information flow downgraders, also referred to as security downgraders, or simply downgraders.

The Information-Flow Security principle establishes that no "illicit flow" of information is allowed in a program. A flow is illicit if it allows untrusted information to be used in a trusted computation (an integrity violation) or if it allows secret information to be entirely or partly revealed to unauthorized users (a confidentiality violation). Integrity and confidentiality can be seen as dual problems by simply stating that there should not be any flow of information from "high" to "low", where "high" means "untrusted" in integrity and "secret" in confidentiality, and low means "trusted" in integrity and "public" in confidentiality.

Information can be tagged with information flow labels. Typically, information flow labels form a partially ordered set or a lattice. If information-flow security was strictly enforced and no illicit flow of information was allowed, most programs would not work. To be "information-flow secure," a program would have to be "partitioned" so that information tagged with a certain label "X" can only flow to program points that have been tagged with labels higher than or equal to "X".

A program with these restrictions is very unlikely to be useful. For example, from an integrity point of view, a Web application is supposed to accept inputs from potentially untrusted users and use those inputs in trusted computations. For example, an online banking program takes as input the account number and the password of a user (potentially untrusted or malformed information) and passes them to the backend database system where they are used in a trusted setting. In another example, an online bookstore takes as input the user ID and password of the customer and the title of the book that the customer wants to buy (all potentially untrusted or malformed information), and uses them to complete a transaction, etc.

From a confidentiality point of view, a Web application often releases data that has been computed based on secret information and, as such, should be considered secret as well. For example, a banking application may reveal to any teller the last four digits of the social security number of any user and an online bookstore may reveal to any shop assistant the last four digits of any customer's credit card number, etc. Given that all these programs exhibit flows that allow "high" information to flow to "low" program points, all these programs would be rejected if information-flow security were simply enforced. To permit these programs to function, "high" information can be "downgraded" and become "low" enough to be used in "low" program points.

Downgrading translates itself into "endorsement" in integrity and "declassification" in confidentiality. For example, once a program has verified that the user-provided input to a Web application is a properly formatted string, the program can endorse that input, which now becomes trusted enough to be used in a trusted computation. Similarly, once a program has verified that the information extracted from a secret is not sufficient to reveal the secret itself, the program can declassify the extracted information, which now can become public enough to be revealed to a public listener.

A program can implement many different types of downgraders. That is, these downgraders are used because a program should not accept any "high" input to a "low" function unless that "high" input has been previously downgraded. A particular downgrader operates for a particular specific subset of the set of "low" functions and thus, a program may be required to implement a plurality of different types of downgraders.

For example, an integrity "low" function that accepts an input in the form of a string, concatenates that string into a Structured Query Language (SQL) query, and then submits it to a database. In this example, the function will require its input not to contain semicolons and apostrophes, since such characters will be interpreted by the database as SQL commands. Therefore, any input to this "low" function should have undergone sanitization (i.e. transformation of an illegal input by removing/replacing suspect parts of the illegal input) or endorsement, to make sure that such illicit characters are not there. Only if a trusted sanitizer has verified the absence of such illicit characters will that initially untrusted string be accepted to be used in the SQL query.

However, if the "low" function is not responsible for performing SQL queries, but rather for concatenating its string input value into HyperText Markup Language (HTML) code, then a different sanitization is necessary. The issue here is no longer to prevent SQL injections, but rather to prevent what are known as Cross-Site Scripting (XSS) attacks. In this case, the sanitization function must check for absence of specific JavaScript tags, such as <script> and </scripts>.

Downgraders are often available in libraries, and are categorized based on the specifications of the corresponding "low" functions. Often, however, Web applications implement their own downgrading functions. This makes security static analysis of Web applications very complex. In fact, a static analysis for information-flow security should receive as input the signature of the downgrading functions as well as rules that map downgrading functions to the corresponding "low" functions. At that point, the static analysis can verify whether the input to a "low" function has always undergone proper downgrading, without any path leading to a "low" function unless its inputs have been properly downgraded. Unfortunately, when Web applications implement their own downgraders, it is very difficult to detect those downgraders and categorize them in a way that the static analysis for information-flow security can subsequently account for them.

Web applications are particularly vulnerable to security attacks because they feed on user input and are typically accessible by a large number of users. According to the Web Application Security Consortium (WASC), approximately 100,000 security vulnerabilities were found and fixed in 2008 with 52,587 of these vulnerabilities being either urgent or critical. This illustrates the importance of protecting Web applications against malicious inputs. This protection is typically implemented using the endorsement/downgrader mechanisms previously described above which either sanitize the user's input (i.e. transform the input by removing/replacing suspect parts of the input) or validate the user's input (i.e. reject the user's input if it is judged to be illegal).

Sanitizers and validators can be thought of as the last (and most application-specific) line of defense against attacks. These mechanisms usually embody subtle reasoning which is meant to distinguish between legal and illegal inputs in various contexts. Moreover, these mechanisms themselves are the interface between the security experts and the application developers. Writing them correctly is not a standard coding task as a thorough understanding of security threats (in the form of the long catalogue of known security attacks) is required. Best practices, guidelines, and policies on how to create sanitization and validation mechanisms are often found in security documents. The challenge is to check whether these guidelines are followed in the code of the Web application. There is currently no automated mechanism to carry out this check.

Moreover, since downgraders are typically written by software engineers, whose expertise lies in developing software rather than understanding the security implications of their design and engineering choices, the number of attacks that are due to incorrect input downgrading is alarmingly high. Most commonly, certain end cases related to removing illegal characters or sequences of characters are left out or addressed incorrectly in the implementation of the downgrader. However, there are also cases where correct downgrading is sensitive to the concrete implementation of the server side components. For example, a downgrader, protecting against SQL injection (SQLi) attacks should apply a different transformation for each type of database server, as these use different meta-characters when parsing SQL commands, e.g., an MS SQL server interprets double hyphen (--) as the beginning of a comment, whereas another database server might interpret the pound symbol (#) as the start of a comment.

Attackers can easily and effectively identify instances where incorrect sanitization is applied to the application by employing fuzzing techniques. This makes things even worse since, at the same time that the attacker reaches the conclusion that a program's protection layer is broken, the attacker simultaneously learns which inputs are used in security sensitive areas in the code, which facilitates the ensuing steps of the attack. Thus, additional challenges arise when determining whether a downgrader is compatible with the systems the downgrader is intended to protect.

SUMMARY

In one illustrative embodiment, a method, in a data processing system, is provided for evaluating downgrader code in application code with regard to a target deployment environment. The method comprises identifying, by an application analysis mechanism of the data processing system, the downgrader code in the application code. The downgrader code is a portion of code in the application code that operates on an information flow of the application code to ensure confidentiality of information input to the downgrader code, in the output of the downgrader code. The method further comprises generating, by the application analysis mechanism, based on an input string, an output string that the downgrader code outputs in response to receiving the input string. The method also comprises retrieving, from a storage system associated with the data processing system, one or more sets of illegal string patterns. Each of the one or more sets of illegal string patterns is associated with a corresponding deployment environment. The illegal string patterns are string patterns that a downgrader identifies in the information flow for security purposes. Furthermore, the method comprises determining, by the application analysis mechanism, whether the downgrader code is compatible with the target deployment environment based on the one or more sets of illegal string patterns and the output string. In addition, the method comprises generating, by the application analysis mechanism, an output indicative of the results of the determining.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 9 is a flowchart outlining an example operation for evaluating the compatibility and strength of a downgrader in accordance with one illustrative embodiment.

DETAILED DESCRIPTION

Figure 1:
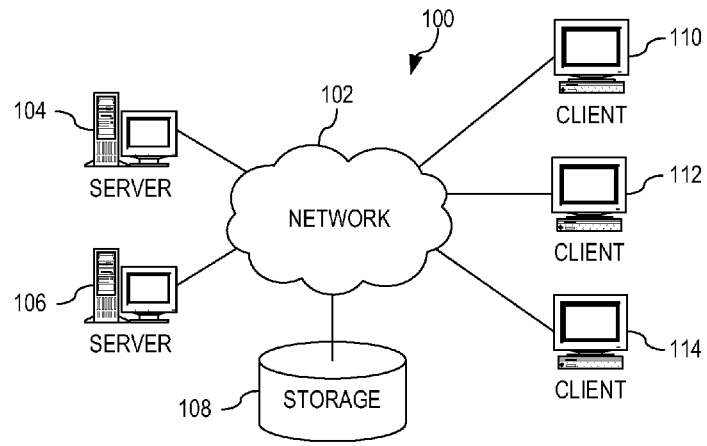
FIG. 1 depicts a pictorial representation of an example distributed data processing system in which aspects of the illustrative embodiments may be implemented.

The illustrative embodiments provide mechanisms for static enforcement of Web application security guidelines by using formal analysis of the quality and conformance of information flow downgraders. In particular, the illustrative embodiments provide automated mechanisms for checking that downgraders in the code of an application, such as a Web application (i.e. an application accessible via the World Wide Web, or the Internet), and ensuring that the code of the application follows guidelines for implementing information flow downgraders. Based on this check, an output as to whether the Web application is in compliance with the guidelines or includes security violations may be generated.

The illustrative embodiments utilize string analysis mechanisms. String analysis is a collection of techniques and mechanisms whose goal is to approximate the set of runtime values that string variables may assume. Example applications of string analysis techniques to Web application security problems are described in co-pending and commonly assigned U.S. patent application Ser. Nos. 12/575,647; 12/825,293; and 12/627,351, which are incorporated herein by reference in their entirety. In particular, co-pending U.S. patent application Ser. No. 12/575,647 describes a technique for automated detection of information-flow downgraders using string analysis.

The mechanisms of the illustrative embodiments operate orthogonally to the mechanisms of the Ser. No. 12/575,647 application directed to how to find downgraders, e.g., sanitizers and validators, in application code. Instead, the mechanisms of the illustrative embodiments are directed to determining how the downgraders are structured and determining if the structure meets established guidelines. The mechanisms of the illustrative embodiments abstract away implementation details of the downgrader and represent the downgrader as a sequence of manipulations on the downgrader's inputs. This abstraction is accomplished by modeling built-in string operations, as well as other instructions of interest. For example, a monadic second-order logic model may be used to model the built-in string operations. The resulting high level abstracted representation of the string operations can then be examined and graded according to a set of guidelines. This may be performed as an automated procedure for quantifying the quality of the application's protection layer, i.e. the information flow downgraders of the application.

The automated mechanism for evaluating downgraders according to established guidelines can be used as an important bridge between application developers and security experts as it allows the security experts to validate code implementations of downgraders and communicate an evaluation to the application developers via a formal mechanism. The automated mechanisms of the illustrative embodiments further are able to identify downgraders whose scores are particularly low such that they may be the reason for business-logic bugs, e.g., if their low score is due to the fact that they eliminate input characters, instead of rejecting the input, which leads to unintended behaviors in business-logic.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
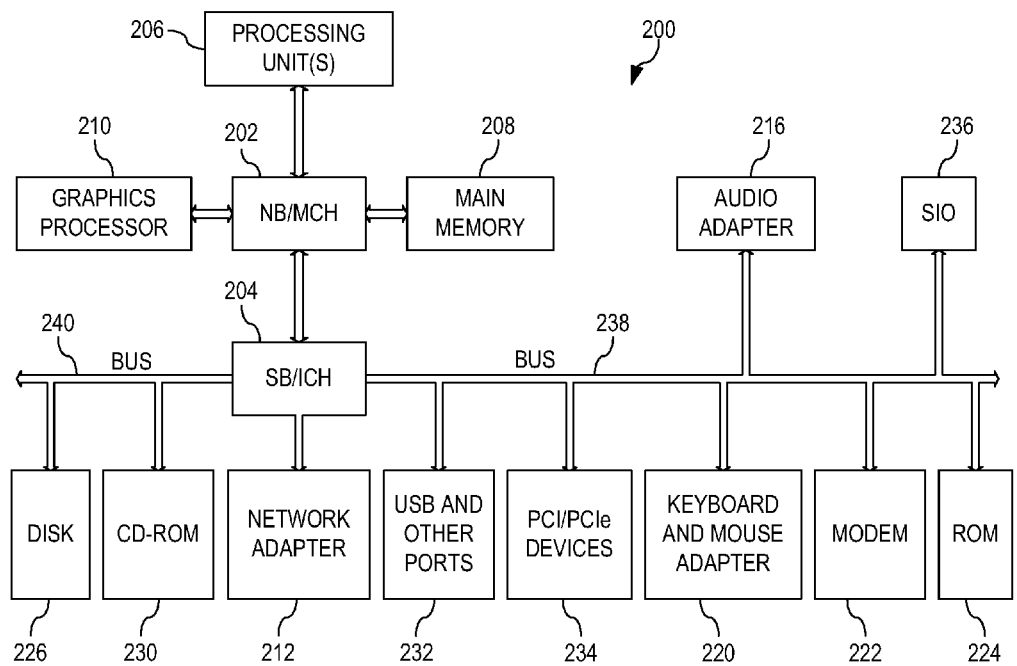
FIG. 2 is an example block diagram of an example data processing system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® 7 (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Oracle and/or its affiliates in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

One or more of the computing devices in FIGS. 1 and 2 may be used to implement aspects of the illustrative embodiments. For example, a server computing device, such as server 104 in FIG. 1, may be used to implement a Web application that may be accessible by one or more client computing devices, such as clients 110, 112, and 114. Before deploying the Web application, or after implementation of the Web application by the server 104, the mechanisms of the illustrative embodiments may be employed to perform analysis of Web application to determine if the downgrader(s) implemented by the Web application, or in conjunction with the Web application, comply with security guidelines. The mechanisms for performing the analysis of the Web application may be implemented in a server computing device, such as, for example, the server 104 upon which the Web application is to be deployed or is already implemented, a client computing device 110, 112, or 114, another computing device, a plurality of computing devices, or the like.

Figure 3:
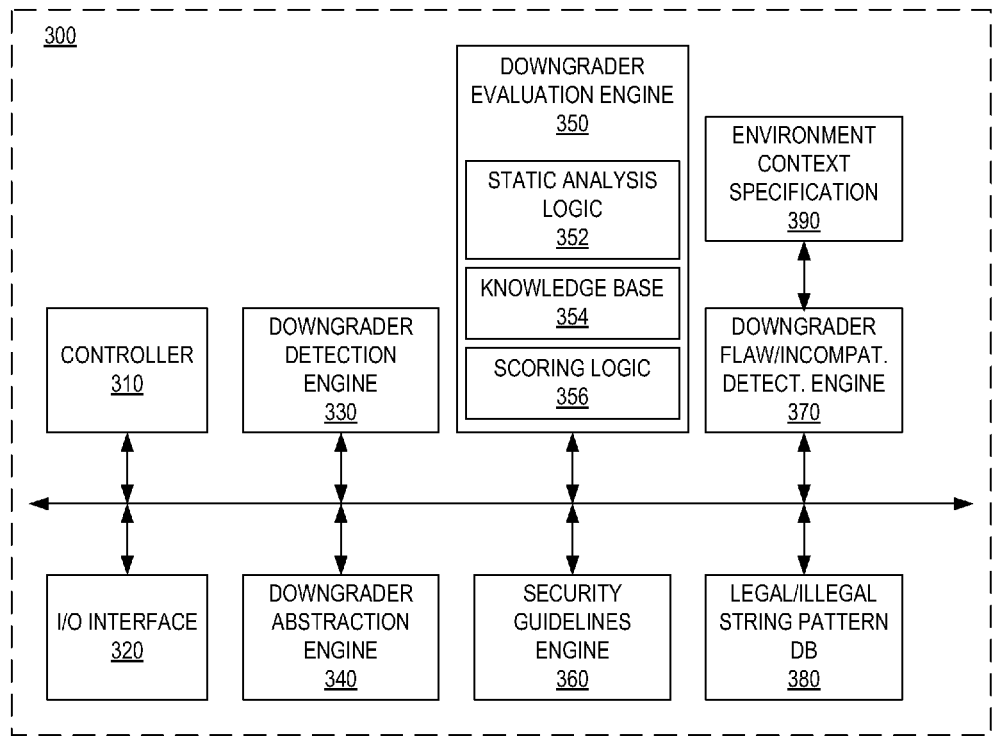
FIG. 3 is an example block diagram of the primary operational elements of an application analysis mechanism in accordance with one illustrative embodiment.

FIG. 3 is an example block diagram of the primary operational elements of an application analysis mechanism in accordance with one illustrative embodiment. The elements shown in FIG. 3 may be implemented in software, hardware, or any combination of software and hardware. In one illustrative embodiment, the elements of FIG. 3 are implemented as software instructions executed by one or more processors of one or more computing devices.

As shown in FIG. 3, the application analysis mechanism 300 comprises a controller 310, an input/output interface 320, a downgrader detection engine 330, a downgrader abstraction engine 340, a downgrader evaluation engine 350, a security guidelines engine 360, a downgrader flaw/incompatibility detection engine 370, and a legal/illegal string pattern database 380. The downgrader flaw/incompatibility detection engine 370 may further operate on an environment context specification 390 which may be stored in conjunction with the application analysis mechanism 300 or may be provided as input to the application analysis mechanism 300 from an external source. The same is true of any of the elements 310-390 in that, rather than being a single mechanism as depicted in FIG. 3, any of these elements may be distributed across a plurality of computing devices and thus, may in one sense be "external" to the application analysis mechanism 300 but yet work in conjunction with the other elements that comprise the application analysis mechanism 300.

The controller 310 controls the overall operation of the application analysis mechanism 300 and orchestrates the operation and use of each of the other elements 320-390. The input/output interface 320 operates to receive inputs, such as Web application code for analysis, user inputs (if any) for configuring the operation of the application analysis mechanism 300, and the like. The input/output interface 320 operates to further generate outputs for providing notifications to developers, security personnel, or other users to inform them of whether or not a Web application's downgraders meet established security guidelines or not, and if not, what violations may be present. Moreover, the input/output interface 320 may operate to further generate outputs for providing notifications to developers, security personnel, or other users to inform them of any flaws and/or incompatibilities between the downgraders and the environments which the downgraders are intended to protect based on analysis performed by the downgrader flaw/incompatibility detection engine 370, as will be described in greater detail hereafter.

The downgrader detection engine 330 analyzes application code to detect in the application code where downgrader code may be present. In one illustrative embodiment, the downgrader detection engine 330 may locate downgrader code within application code using string analysis in a manner such as described in co-pending and commonly assigned U.S. patent application Ser. No. 12/575,647 (hereafter referred to as the '647 application). Of course, other known, or later developed, mechanisms for detecting downgrader code within application code may be used without departing from the spirit and scope of the illustrative embodiments.

In order to provide one example of how downgrader code may be identified within application code, it is assumed that the string analysis of the '647 application is utilized. In such a string analysis, application code is first translated into a context-free grammar (CFG) with string operations in a manner such as described in Yasuhiko Minamide, "Static Approximation of Dynamically Generated Web Pages," Proceedings of the 14$^{th}$ International Conference on World Wide Web (WWW '05), 2005), hereby incorporated by reference. The string operations are then removed from the context-free grammar to generate production rules by applying approximated string operation functions over CFGs which correspond to the string operations in the original application code. These production rules are typically denoted by the form N→X1 ... Xn, where N is a variable and X1 ... Xn are variables or characters and constitute the context-free grammar. The approximated string operation functions are functions that translate a CFG to another CFG, e.g., a transducer that is a finite state automaton with output symbols. Application of the approximated string operations is iterated until there are no more string operations in the production rules. This results in a context-free grammar that consists of the production rules without string operations.

That is, a program is represented as a context-free grammar, where the starting variable corresponds to the string you are interested in approximating. Suppose, for example, that this string is v in: "v=v1.concat(v2);". Computing the abstract value of v requires knowledge of the abstract values of v1 and v2, and moreover, the "concat" operation needs to be removed from the grammar by modeling its effect on v1 and v2 once their values are known. This is what's meant above by stating that application of the approximated string operations is iterated until there are no more string operations in the production rules.

Suppose also that it is learned that v depends on v1 and v2, so the approximation may considering v1 and v2 as the starting variables recursively (each in turn). The original production rule is not necessary for obtaining the abstract values of these strings (unless there's a cyclic definition as discussed further below). Once this recursive consideration of v1 and v2 is performed, the operation returns to the grammar for v, and applies a transducer approximating the effect of "concat". This yields a simplified grammar, where the "concat" operation is no longer present, and in fact, the rule simply assigns a value to v. Fixpoint iteration, rather than the above described recursion, is needed to handle cyclic definitions, e.g., if the concatenation is done in a loop: The value of v at the i-th iteration depends on its value in the (i−1)-th iteration.) As a further example, consider the following Java™ program which appends "a" to the string assigned to the variable a three times after initializing it with the string value "a."

string $a$ = "a";

for(int $i$=0;$i$<3;$i$++)

$a$=$a$+"a";

string $r$=$a$;

The following CFG is obtained by translating every application variable v into a nonterminal string variable $S_v$ and "=" into a → as in production rules, where the string concatenation by + is considered to be a string concatenation on the CFG.

$S_a$→$a$ $S_a$→$S_a a$ $S_r$→$S_a$

For example, the CFG with start symbol $S_a$ represents a set of possible string values assigned to the application variable a, which yields the set of strings {"a","aa","aaa", "aaaa", ... }. Likewise, the symbol $S_r$ represents a set of possible string values assigned to the program variable r. It contains strings that are never assigned to the variables a and r, since the string analysis completely ignores the condition of the "for" statement.

When the application code uses predefined string operations, such as String.substring as shown in the following portion of application code, a sound approximation is used for every string operation to translate a application code into a CFG. For example, consider the predefined string operation in the following portion of code:

String $a$= "xxa";

for(int $i$=0;$i$<3;$i$++)$a$=$a$+"a";

String $r$=$a$.substring(2);

Soundness of the approximated string operation means that a resulting CFG computed by the approximated string operation contains all the actual strings computed by a predefined string operation that corresponds to the approximated string operation. One of the methods to approximate the predefined string operation is to use a transducer which is an automaton with output.

Soundness may be formally defined as follows: $\underline{f}$ is a sound approximation for a string operation f iff $S' \subseteq \underline{f}(S)$ where $S'=(s'|s'=f(s), s \in S)$. One of the methods to approximate predefined string operations is to use a transducer which is an automaton with output. It is well known that the image of a transducer is also a CFG. Other methods are homomorphisms on $(\Sigma,+)$ where $\Sigma$ is a set of characters and + denotes concatenation functions that always return the same CFG yielding all the possible strings returned by corresponding predefined string operations, and so on. The following production rules with the approximated string operation substring (__,2) are the ones obtained from the example portion of application code above by using sound approximation:

$S_a$→xxa $S_a$→$S_a a$ $S_r$→substring($S_a$,2)

Figure 4:
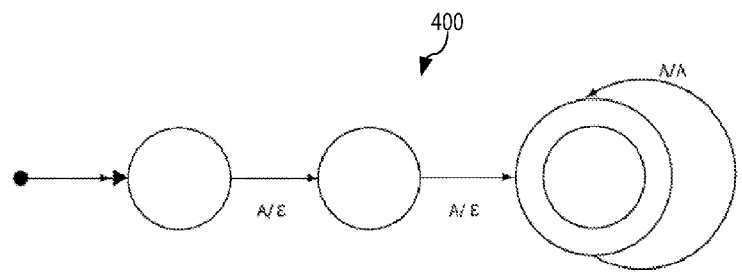
FIG. 4 is an example diagram of a transducer which may be utilized by the mechanisms of the illustrate embodiments to generate a context free grammar.

Referring now to FIG. 4, a transducer 400 is illustratively depicted. An approximated string operation substring (__,2) is defined by the transducer 400 and is a sound approximation for the string operation substring(__,2). By applying the depicted transducer 400 to the grammar consisting of the above production rules, one can obtain the following CFG which represents the set {"a","aa","aaa","aaaa", ... }.

$S_a'$→$a$ $S_a'$→$S_a' a$ $S_r$→$S_a'$

The symbol A in FIG. 4 represents any character while A/ϵ represents a transformation of any one character to the empty string, which means removing the character. With a "sound" transducer, the resulting abstract value is a safe approximation of the strings that may result from the operation at runtime. Thus, for "substring (__, 2)", the representation simply removes the first two characters in the string, as indicated by the labels A/ϵ (essentially removes character A). A new CFG is obtained which results from applying the transducer to the original grammar.

After iteratively applying the above mechanisms to the application code, a set of product rules representing the application, but in which no string operations are present, is obtained. Thus, a context-free grammar consisting of the resulting production rules is the outcome of the string analysis.

Figure 5:
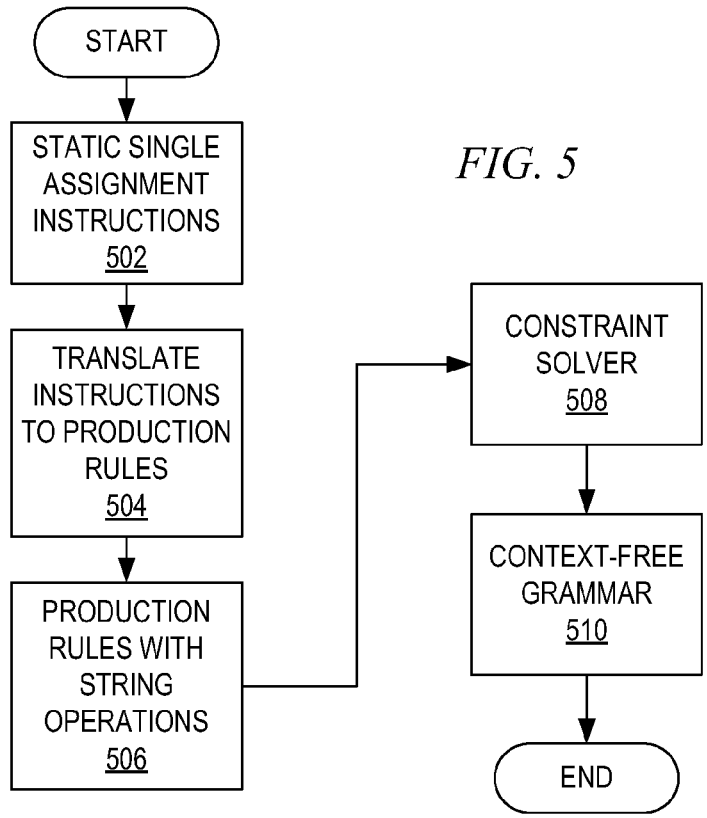
FIG. 5 is an example diagram illustrating a static string analysis in accordance with one illustrative embodiment.

Referring to FIG. 5, one illustrative embodiment will now be described for implementing a static string analysis in accordance with the illustrative embodiments. The description provided deals with intra-procedural string analysis, and then explains how to extend that to inter-procedural string analysis. The implementation details presented assume that the string analysis has been implemented on top of a static analysis framework. The static analysis framework employed may be any known framework and may include, for example, the Watson Libraries for Analysis (WALA), available as an open source product from wala.sourceforge.net.

To describe the intra-procedural string analysis, consider the nappend method in Java™ which is as follows:

```
public class MyClass {
    static public void main(String args[ ]) {
        String a = "a"; String b = "b";
        String r = nappend(a, b, 3);
    }
    public void nappend(String x, String y, int n) { String r = null;
        if (n == 0) {
            r = x;
        }
        else {
            r = nappend(x + y, y, n-1);
        }
        return r;
    }
}
```

Figure 6:
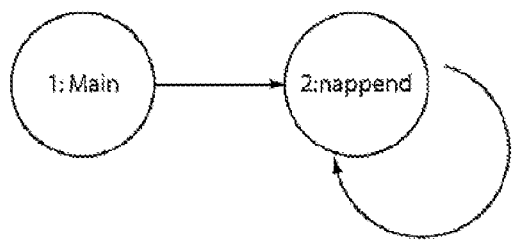
FIG. 6 is a call graph for an example program in accordance with one illustrative embodiment.

In block 502, a translation of a program is made into Static Single Assignment (SSA) form, where pseudo notations are used for instructions. An example, translation is illustratively shown as follows:
main(String)
  1. a="a"
  2. b="b"
  3. r=nappend(a, b, 3)
nappend(String)
  1. b1=n==0
  2. goto 6 if b1
  3. v1=x+y
  4. r1=nappend(v1, y, n−1)
  5. goto 8
  6. r2=x
  7. goto 8
  8. r=phi(r1,r2)
  9. return r A call graph for this program is depicted in FIG. 6. Pseudo notations used for instructions in the above program include v=val for an assignment of a value val to a variable or a field v, v=obj.func(v1, . . . , vn) for a method invocation with arguments v1, . . . , vn, goto N for an unconditional jump to the label N, goto N if v for a conditional jump to the label N by the condition v. In addition, the SSA transformation introduces new variables and a φ-function, which is denoted by phi(v1, v2), to yield a program which has only one assignment to each variable. This characteristic of the SSA form is suitable to find data dependencies.

In block 504, the assignments in SSA form are translated to a set of production rules with string operations 506, except for conditional and unconditional jumps, in the same manner described above (See FIG. 1 above). In particular, v=phi(v1, v2) is translated into two production rules $S_v \to S_{v1}$ and $S_v \to S_{v2}$ so as to make it represent a union of the two sets of strings assigned to v1 and v2, respectively. According to this translation, one can obtain the following production rules from the pseudo SSA form of the nappend method.

$$S_{v1} \to S_x S_y$$

$$S_r^1 \to \text{nappend}(S_{v1}, S_y, n-1)$$

$$S_{r2} \to S_x$$

$$S_r \to S_{r1}$$

$$S_r \to S_{r2}$$

For the inter-procedural string analysis, the intra-procedural string analysis is extended with the call graph information constructed by WALA, whose context-sensitivity can be flexibly controlled by known methods. Every variable in the SSA program is annotated with a call graph node. All the production rules are combined after removing production rules translated from method invocations such as $S_r^1 \to \text{nappend } (S_{v1}, S_y, n-1)$. Production rules representing dependencies between the parameters and the return value of a callee method and the variables of a caller method are introduced. For example, the following production rules are introduced if a context-insensitive call graph 600 as shown in FIG. 6 is present, where the superscript of each non-terminal represents the corresponding call graph node. The production rules are:

$$S_x^2 \to S_a^1 S_x^2 \to S_{v1}^2$$

$$S_y^2 \to S_b^1 S_y^2 \to S_y^2$$

$$S_r^1 \to S_r^2 S_{r1}^2 \to S_r^2$$

A complete set of the production rules with string operations 506 obtained from the program includes:

$$S_a^1 \to a S_x^2 \to S_a^1$$

$$S_b^1 \to b S_y^2 \to S_b^1$$

$$S_{v1}^2 \to S_x^2 S_y^2 S_r^1 \to S_r^2$$

$$S_{r2}^2 \to S_x^2 S_x^2 \to S_{v1}^2$$

$$S_r^2 \to S_{r1}^2 S_y^2 \to S_y^2$$

$$S_r^2 \to S_{r2}^2 S_{r1}^2 \to S_r^2$$

An optional pointer analysis may be performed that helps the string analyzer or solver 308 to identify how constant strings flow to variables across methods and to identify whether the same objects are assigned to different variables in potentially different methods, even if those objects are dynamically created. In block 510, the following CFG is obtained that predicts possible strings assigned to the variable r in the main method, where the start symbol is $S_r^1$.

$$S_r^1 \to a|S_r^1 b$$

Figure 7:
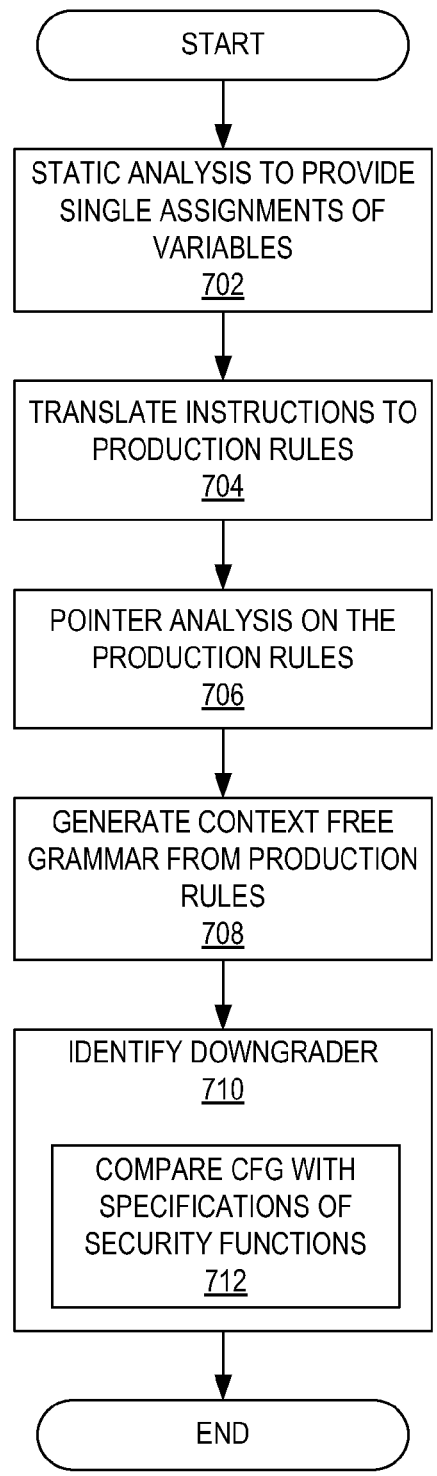
FIG. 7 is an example a block/flow diagram that illustratively depicts a system and method for static detection and categorization of information-flow downgraders in accordance with one illustrative embodiment.

Referring to FIG. 7, a block/flow diagram illustratively depicts a system and method for static detection and categorization of information-flow downgraders in accordance with the illustrative embodiments. The system and method shown in FIG. 7 may be implemented in the downgrader detection engine 330 in FIG. 3, for example, for detecting portions of code in application code that correspond to downgraders.

As shown in FIG. 7, in block 702, a program stored in a memory device, which may have been provided from a separate device via the input/output interface 320 in FIG. 3, for example, is transformed by statically analyzing program variables to yield a single assignment to each variable in an instruction set. This includes transforming the application code by employing pseudo notations for program variable assignments.

In block 704, the instruction set is translated to production rules with string operations in a manner as described above, for example. In block 706, a pointer analysis, as is generally known in the art, is optionally performed on the production rules with string operations to improve precision.

In block 708, a context-free grammar is generated from the production rules. In block 710, an information-flow downgrader function is identified by checking the context-free grammar against one or more function specifications. The one or more function specifications consist of a string pattern, such as a regular expression. This string pattern is given by an analysis tool or a user, and it represents a set of strings which may (or may not) be used in a security-sensitive operation. For example, the strings "<" and ">" are considered to be unsafe strings since these characters are typically used by XSS (cross-site scripting) attacks. Therefore, regular expressions ".*[<>].*" (i.e. specifying that the "<" and ">" strings are not safe) may be part of a specification for an information-flow downgrader that is used to avoid the XSS attacks.

The one or more functions preferably include a security-sensitive function in the application code. This may include detecting and categorizing the downgrader functions based upon a purpose of the downgrader function.

In block 712, the context free grammar is preferably compared with a specification of an information-flow downgrader, such that if the grammar satisfies the specification, the input is considered properly downgraded. Comparison between a context-free grammar and a specification of a regular expression can be done, for example, by a CFL reachability algorithm, as described in the paper "Program Analysis via Graph Reachability" by Thomas Reps, University of Wisconsin, August 1998.

The one or more function specifications are employed to categorize the downgrader function as being a correct downgrader for one or more security vulnerabilities, for example. It is assumed that there are multiple string patterns (regular expressions) each of which is corresponding to a security vulnerability, such as cross-site scripting (XSS) and HTTP Response Splitting (HRS). When there are string patterns for XSS and HRS, for example, the obtained context-free grammar is compared with those two string patterns. If the intersection of the context-free grammar with the XSS pattern is not empty, the corresponding function is detected as a correct information flow downgrader for XSS, where the intersection can be computed by the CFL reachability algorithm mentioned above, for example. Likewise, if the intersection of the context-free grammar and the HRS pattern is not empty, the corresponding function is detected as a correct information flow downgrader for HRS. It should be noted that the function may be detected as a correct information flow downgrader for both XSS and HRS as well in this example. Of course the present invention is not limited to XSS and HRS, but may be used with any known or later developed security vulnerabilities.

Another type of string analysis that may be employed, and which is used in illustrative embodiments of the present invention, uses a monadic second-order abstraction of the downgraders to perform string analysis. Referring again to FIG. 3, having identified one or more downgraders in the application code in some manner, such as the manner described above, the downgrader abstraction engine 340 is employed to build an abstract representation of the downgraders. That is, the downgrader abstraction engine 340 may be applied to each downgrader identified in the application code so that a separate abstract representation of the downgrader is generated to model the downgrader.

In one illustrative embodiment, the downgrader abstraction engine 340 may implement monadic second-order logic on strings in the downgrader where the downgrader's code is represented as a formula in monadic second-order logic. An example implementation of monadic second-order logic as applied to strings is described in Elgaard et al., "MONA 1.x: New Techniques for WS1S and WS2S," available from www-.brics.dk/mona/papers/mona1x-new-technique-ws1s-ws2s/article.pdf, which is hereby incorporated by reference herein.

With this monadic second-order logic, instructions in the downgrader code that do not manipulate the input to the downgrader code are either ignored, if possible, or represented in a way that reflects the instructions' influence on the downgrader's result. For example, a test of the form "if (input.contains("xyz")){ ... }" is represented by asserting, inside the body of the condition, that the input contains string "xyz."

Again referring to FIG. 3, using the abstract representation generated by the downgrader abstraction engine 340, the downgrader evaluation engine 350 evaluates the way in which the downgrader processes the input to the downgrader code in the application code, e.g., evaluating the way in which a sanitizer operates to transform or remove/replace suspect parts of the input or the way in which a validator judges whether an input is illegal or not and determines whether or not to reject the input. This evaluation involves comparing the downgrader processing of input against a specification, such as a set of formal security guidelines specifying how downgraders should operate. For example, the security guidelines engine 360 may provide pre-established security guidelines that set forth a set of rules and conditions under which downgraders are required to operate in order to avoid any security issues with the operation of application code. These pre-established security guidelines may be defined by security personnel and set forth in a database or other data structure associated with the security guidelines engine 360. The security guidelines engine 360 may provide one or more user interfaces through which such security personnel or other users may define and store such security guidelines in the database or data structure.

For example, assume that a pre-established security guideline for the downgraders is that inputs to the downgrader should either be accepted or rejected (e.g., such as is done by a validator), but not mutated by the downgrader (e.g., as is done by a sanitizer). This security guideline prefers or favors validators over sanitizers. Functionally, both a validator and sanitizer may be equally correct for ensuring the security of the application, however, a sanitizer may be more difficult to reason about (e.g., the side effects of a replacement operation performed by a sanitizer need to be considered) and more problematic in terms of user expectations (e.g., the change that the sanitizer performs may invalidate certain logic aspects of the input).

Considering an abstract representation of the downgrader as generated by the downgrader abstraction engine 340, a static-analysis mechanism 352 of the downgrader evaluation engine 350 interprets the effect of the operations the downgrader performs on its input and determines whether it is the case that the input is mutated, e.g., the downgrader implements a sanitizer. If so, and a security guideline rule is in place and provided by the security guidelines engine 360 that indicates that inputs to the downgrader are not to be mutated, then the downgrader evaluation engine 350 may generate an output indicating that a violation of a security guideline is present in the evaluated downgrader. This output may be a notification message sent to a designated contact address, an output generated on a client computing device's output device, be it a display device, printer, etc., or the like. The notification message may indicate the application, the security guideline violated, and the location within the application code where the security guideline violation was detected, i.e. what downgrader violated the security guideline, for example.

Moreover, the downgrader evaluation engine 350 may comprise logic for identifying the violation as well as checking a knowledge base 354 associated with the downgrader evaluation engine 350 to determine recommendations for modifying the downgrader code to make the downgrader in compliance with established security guidelines. For example, if it is determined that the downgrader mutates the input to generate a sanitized output from the downgrader, and the above security guideline is in place, then the downgrader evaluation engine 350 may check the knowledge base 354 based on the detected violation as well as other information about the structure of the downgrader code which may be extracted using the static-analysis mechanisms, and recommend that the downgrader code be modified to replace the sanitization elements of the downgrader code that mutate the input with portions of code that either accept or reject the input without mutating the input.

In some illustrative embodiments, the downgrader evaluation engine 350 may further include downgrader scoring logic 356. The downgrader scoring logic 356 operates to identify a degree to which a downgrader diverges from the established security guidelines provided by the security guidelines engine 360 and quantify this degree of divergence to generate a score for the downgrader. For example, the score may be simply a count of a number of security guidelines violated by the downgrader code, a weighted count of a number of security guidelines violated where the weight is associated with the particular security guidelines violated to thereby indicate a priority of security guidelines, or the like.

The score for a downgrader, once calculated in the manner described above based on its divergence from established security guidelines, may be compared to one or more established threshold values to obtain an indication of which downgraders are considered to represent mild, moderate, or significant security threats to the application, for example. Various processing can be performed based on this categorization of downgraders into security threat levels. For example, downgraders representing a mild security threat may simply be identified and a notification sent to an appropriate user to inform them of the potential security issues associated with the downgrader. Downgraders that represent a moderate and significant security threat may have higher priority notifications generated and sent to one or more users and may include further information regarding suggested modifications to the downgrader code to make the downgrader in compliance with established security guidelines.

In some illustrative embodiments, the downgrader evaluation engine 350 may automatically modify the downgrader code based on the evaluation of the downgrader with regard to established security guidelines so as to place the downgrader in compliance with the security guidelines or at least lessen the security threat posed by the downgrader. For example, in one illustrative embodiment, if a downgrader is determined to be a sanitizer and the downgrader is determined to be a significant security threat, the downgrader evaluation engine 350 may automatically modify the code of the downgrader to change it to a validator to thereby reduce the security threat. The modified code may then be provided to an appropriate user such that it may then be recompiled before deployment on a computing device.

Thus, the mechanisms of the illustrative embodiments not only provide a mechanism for identifying downgrader code within application code, but also provide mechanisms for abstracting this downgrader code such that the downgrader processes may be evaluated against established security guidelines. In this way, an automated mechanism is provided for ensuring that downgraders provide a minimum level of security with regard to the application as defined by the security guidelines. The mechanisms of the illustrative embodiments are able to model operations of a downgrader using string-analysis in a way that conservatively captures the concrete semantics of the operations and come to a conclusion as to whether a downgrader meets the minimum security guidelines automatically.

Figure 8:
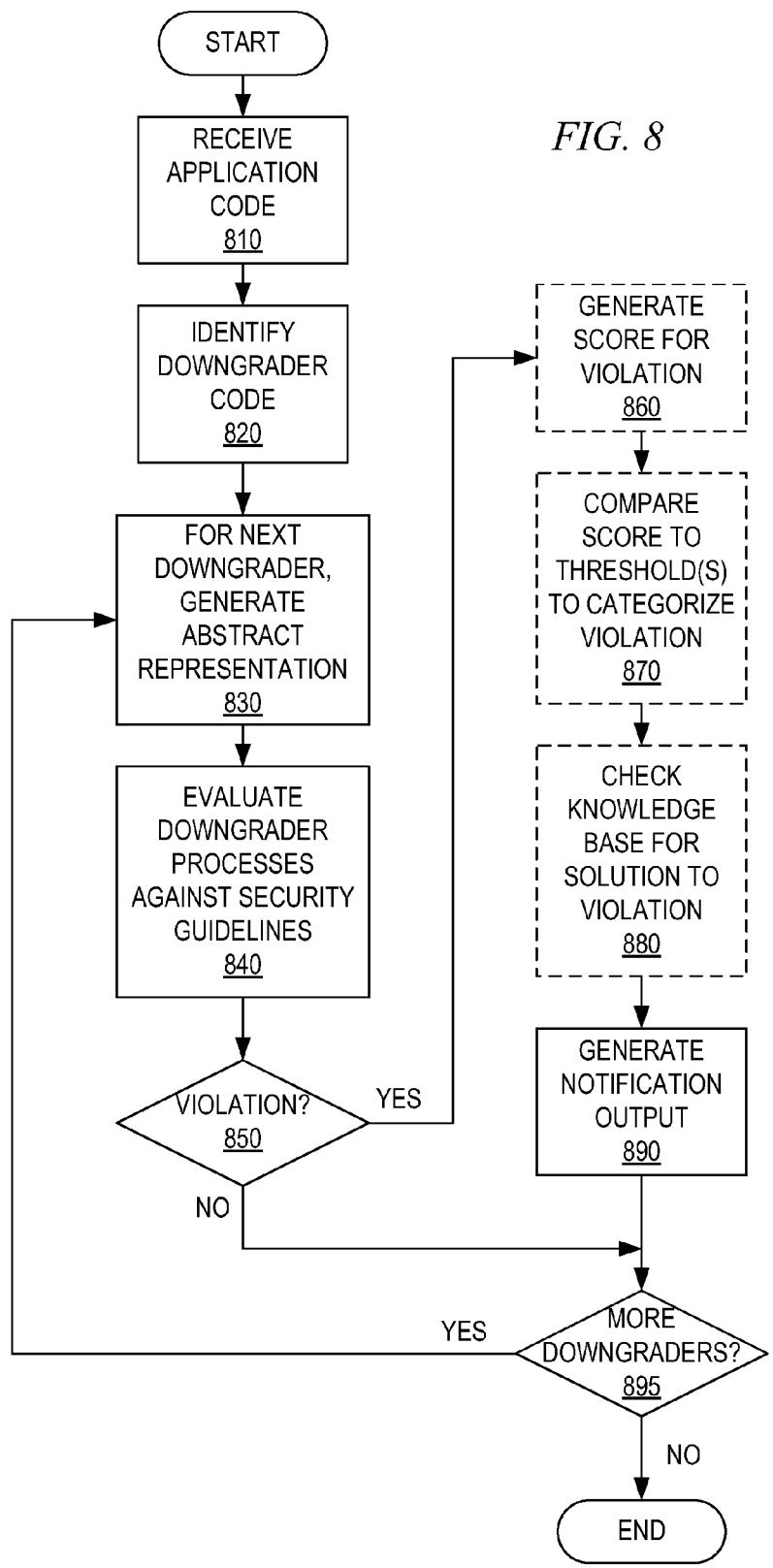
FIG. 8 is a flowchart outlining an example operation of an automated application analysis mechanism in accordance with one illustrative embodiment.

FIG. 8 is a flowchart outlining an example operation of an automated application analysis mechanism in accordance with one illustrative embodiment. As shown in FIG. 8, the operation starts with the receipt of application code to be analyzed (step 810). The static-analysis mechanisms are applied to the application code to identify downgrader code within the application code (step 820). For a next downgrader identified in step 820, an abstract representation of the downgrader is generated (step 830). The downgrader processes are then evaluated against established security guidelines using the abstract representation of the downgrader (step 840). A determination is made as to whether there are any detected violations of the security guidelines based on this evaluation (step 850). If so, optionally, the degree of the violation, or deviation of the downgrader processes from the security guidelines, is quantified so as to generate a score for the downgrader (step 860). The score may then be compared against one or more thresholds to thereby categorize the severity of the downgrader violation of security guidelines (step 870). In addition, optionally, a knowledge base may be accessed to identify a recommended solution to the security guideline violation so as to bring the downgrader into compliance with the security guidelines (step 880).

Based on the detection of the violation, and optionally the score and/or information obtained from the knowledge base, a notification message regarding the security guideline violation may be created and output (step 890). Thereafter, a determination is made as to whether there are additional downgraders in the application code to process (step 895). If so, the operation returns to step 830; otherwise the operation terminates.

It should be noted that while the above illustrative embodiments describe one mechanism for identifying downgraders within application code, such as a Web application, the illustrative embodiments are not limited to this one mechanism. To the contrary, any mechanism for locating portions of code within application code, which corresponds to or performs a downgrader function may be used without departing from the spirit and scope of the illustrative embodiments. Moreover, while the illustrative embodiments are described as being applied to a Web application and the information flow associated with a Web application, they are not limited to such. Rather the illustrative embodiments may be utilized with any application code that implements downgraders in the application code or in association with the application code.

Referring again to FIG. 3, in addition to the above mechanisms for finding downgraders and evaluating them against established security guidelines, the illustrative embodiments further provide mechanisms, such as the downgrader flaw/incompatibility detection engine 370, for detecting flaws in the downgraders and incompatibility problems in downgraders with regard to the systems that they are intended to protect, even if the security downgraders meet the established security guidelines discussed above. That is, while the mechanisms described previously can determine whether the downgrader is performing the type of security operations that the downgrader is intended to perform with regard to security guidelines, the further mechanisms of the illustrative embodiments described hereafter comprise logic for ensuring that the specific implementation of the downgrader in a specific environment is performing these security operations correctly, i.e. there are no flaws or incompatibility issues with regard to the implementation of the downgrader and the environment in which it is deployed.

In addition, the illustrative embodiments may also address correctness issues related to the downgrader that are beyond compatibility problems with the deployment environment. That is, if the downgrader code would otherwise be compatible with the deployment environment, but the code of the downgrader itself is not operating properly, i.e. is not matching all of the illegal patterns that it should to ensure the security of the systems with which it is associated, then the matching mechanisms of the illustrative embodiments will detect these flaws in the operation of the downgrader. These are referred to as "end cases" that the downgrader fails to address correctly. Problems with compatibility with the deployment environment are referred to as "horizontal" problems while problems with downgraders addressing end cases are referred to as "vertical" problems.

The illustrative embodiments provide mechanisms for automatically, using static analysis techniques, identifying whether a downgrader is incomplete, incorrect, or incompatible with the back-end software/hardware, i.e. the environment, it is expected to protect. This is done using three primary components. The first component is a string analysis mechanism which computes, based on a specification of the possible input strings to the downgrader, a safe approximation of a set of strings that the downgrader may output if the downgrader is operating correctly.

The second component is a set of "illegal patterns" that form a partially-ordered set with respect to the correctness of the validator or sanitizer of the downgrader. An illegal pattern is a compact representation of a set of strings, e.g., a regular expression or a context-free grammar) which may not be returned/accepted by the validator/sanitizer routine. That is, an illegal pattern is a regular expression e such that for a validator V to be considered safe with respect to the expression e, the validator V must reject the input string if it matches expression e and for a sanitizer S to be considered safe with respect to expression e, any string returned by sanitizer S must not match expression e.

To illustrate what is meant by an illegal pattern, consider two patterns A and B where one pattern (A) is a strict subset of the other pattern (B). If a validator of a downgrader operates correctly with respect to pattern B, then it can be concluded that the validator operates correctly in general, i.e. with respect to pattern A. However, if the validator only operates correctly with respect to pattern A and not B, then the validator is only partially correct in its operation because there are strings in pattern B, and not in pattern A, that the validator may return/accept but are not safe. For example, a possible illegal pattern for cross-site scripting (XSS) attacks, for example, is one that asserts that the string does not contain "<" or ">", i.e. strings containing "<" or ">" may be indicative of an XSS attack. A more restrictive illegal pattern would also require that the string does not contain the substring "javascript:". Thus, the set of illegal patterns represent sets of strings that cannot be returned/accepted by the validator/sanitizer of the downgrader without violating the security of the back-end software/hardware systems. This partial order, i.e. sets of illegal strings being restrictive, more restrictive, and the like, provides a mechanism that allows the analysis insight into which end cases are not addressed and consequently, may be used to indicate how the downgrader should be remedied or fixed, as discussed hereafter.

The third component is a specification of the environment context which the downgrader is expected to protect, i.e. a description of the software, and in some cases the hardware, with which the downgrader is to operate. For example, the environment context may specify the type of server that the downgrader is to be, or already is, deployed in (e.g., the types and numbers of processors, the amount of memory, etc.), the database server software being run on the server, such as Microsoft (MS) Structured Query Language (SQL) server, DB2, etc. The environment context information may further specify the type of application container where the database application is deployed, e.g., Tomcat, JBoss, WebSphere, or the like, since different containers may behave differently in terms of request parsing and processing which may dictate the different downgraders used (for example, Tomcat removes "\r\n" patterns from parameter values which makes these values safe against HTTP response splitting (HTTPRS) attacks, but this is not necessarily the case with WebSphere).

With reference again to FIG. 3, the environment context 390, i.e. the "third component" mentioned above, may be user specified through inputs received to one or more graphical user interfaces or the like, via the input/output interface 320. Alternatively, the environment context 390 may be discovered or inferred automatically from configuration information maintained by the system in which the environment is present. For example, with a database system, the environment context specification 390 defining the type of the database system may be discovered or inferred by analyzing the configuration information for the database system, inspecting the deployment of the database software, etc. In other instances, such as with downgraders directed to handling cross-site scripting (XSS) attacks or the like, HTML context information may be used. In such a case, static data flow analysis on data flowing into the downgrader may be performed to determine which HTML rendering statements are data flow dependent on the downgrader's output and then string analysis can establish the HTML context(s) at the point where the information is rendered, as described in commonly owned and co-pending U.S. patent application Ser. No. 12/825,293 file Jun. 28, 2010, which is hereby incorporated by reference.

For the particular downgrader, a definition of the set of illegal patterns that may be matched by the downgrader, i.e. identified as illegal, is provided by a user or otherwise determined from an analysis of the downgrader code. That is, for various environments, a downgrader may match different illegal patterns. The particular illegal patterns that a particular downgrader matches may be specified by a user and stored in the legal/illegal string pattern database 380, for example, or otherwise associated with the particular downgrader. However, in other illustrative embodiments, the downgrader code may be analyzed by the downgrader flaw/incompatibility detection engine 370 or other tool (not shown) to identify the particular patterns that the particular downgrader looks for and matches and either is indicative of a rejection of the input (in the case of a validator) or is the basis for a modification of the input (in the case of a sanitizer).

Still further, a plurality of sets of illegal patterns may be stored in the legal/illegal string pattern database 380 for various types of downgraders, e.g., downgraders directed to XSS attacks, SQLi attacks, or the like. The sets of illegal patterns may comprise illegal patterns for a plurality of different downgraders of the same type and for a plurality of different environments in which these downgraders may be implemented. A particular set of illegal patterns may thus be identified, for example, based on the type of the downgrader being evaluated. For example, the downgrader flaw/incompatibility detection engine 370 may determine the type of downgrader being analyzed and retrieve a corresponding set of illegal string patterns from the legal/illegal string pattern database 380. The downgrader type may be determined from the context of the application, according to the vulnerable information flows the downgrader should inhibit. For example, if there is a downgrader call mediating an information flow from an XSS sink to an XSS source, then the illustrative embodiments will verify that call per the XSS specification (including illegal patterns). Determining which calls along a vulnerable information flow are candidate downgrader calls can be resolved heuristically, based on the signature of the called method (e.g., String→String for a sanitizer and String→Boolean for a validator).

For example, a downgrader directed to detecting and handling SQL injection (SQLi) attacks may be associated with a set of illegal string patterns such as that shown below:

```
".*('|\\x22|\\#|%|=|;|\\+|[cC][hH][aA][rR]\\s*\\(\\s*\\d+\\s*\\)).*" // SQL
Injection
(using # comment char)
".*('|\\x22|--|%|=|;|\\+|[cC][hH][aA][rR]\\s*\\(\\s*\\d+\\s*\\)).*" // SQL
Injection
(using -- comment chars)
".*('|\\x22| ∧ \*|\\*/|%|=|;|\\+|[cC][hH][aA][rR]\\s*\\(\\s*\\d+\\s*\\)).*" //
SQL Injection
(using /**/ comment chars)
```

The structure of these example illegal string patterns is as follows. The pattern begins (and ends) with .* meaning that this pattern is looking for a match within the input string of a downgrader (see below). The pattern then contains an opening parenthesis (to signify the start of the set of what is consider illegal patterns. The pattern then contains a list of illegal patterns delimited by a pipe character |. The pattern closes the set of illegal patterns with an ending parenthesis) and the pattern ends with .*.

For example, in the SQLi illegal string patterns defined above, the following set of illegal strings are present that are trying to be matched:

'
"(defined by \\x22)
A comment character. Either #, --, or /**/ depending on the SQL syntax used.
=
;
+
char(\d+) This is essentially the "char" SQL function followed by a series of one or more digits. Note that the use of [Cc] allows one to make the match of the word "char" case-insensitive. This gives the ability to match case-sensitively or case-insensitively.

Each of these 3 illegal patterns is the same except for one small, but important, part; which is the type of comment character that is matched. In the first pattern a # single-line comment delimiter character is matched, in the second pattern the -- single-line characters are matched, and in the third the // multi-line comment characters are matched. The other parts of each pattern remain the same. Different style comments are used for different SQL languages. For instance, PL/SQL used in Oracle databases and T-SQL used in Microsoft databases, use the -- single-line and // multi-line comments, whereas MySQL adds the # single-line comment to the list of valid comment syntax.

Each of the illegal patterns set forth above is associated with a different environment (e.g., a SQL dialect such as T-SQL or PL/SQL) in which the downgrader may be implemented. A downgrader may match one of these illegal patterns when identifying input strings corresponding to SQLi attacks. Essentially, if an input string is received in the downgrader and the input string, or a part of the input string, matches a corresponding one of these patterns, then the downgrader detects the input string as a potential threat and either rejects the input (validator) or modifies the input string to remove or modify the portion of the input string matching the illegal string pattern (sanitizer).

The environment context information 390 is used by the downgrader flaw/incompatibility detection engine 370 to determine which patterns of strings should be matched by a particular downgrader, i.e. identified by a validator/sanitizer of the downgrader as illegal string patterns, for the particular environment context. That is, the environment context specification 390 may be used to determine which of the illegal string patterns in the set of illegal string patterns should be matched by the implementation of the downgrader in the particular environment corresponding to the environment context specification 390. As described hereafter, it can be determined whether the downgrader is actually matching the illegal pattern that it should be matching and if not, an indication that the downgrader is incompatible with the environment in which it is deployed may be generated.

For example, for a MS SQL server, a downgrader targeting SQL injection (SQLi) attacks will, for a particular set of inputs, generate a particular set of outputs. From this, the string analysis mechanism of the downgrader flaw/incompatibility detection engine 370 computes a safe approximation of the set of strings that may be returned/accepted by the downgrader, i.e. a set of strings that are valid outputs of the downgrader given a set of input strings if the downgrader is working properly and is compatible with the environment in which it is implemented. A safe approximation means that the set of return values that the analysis computes for the downgrader contains the set of return values it may return in concrete runs of the program. This means that the analysis has a one-sided error: It can classify a correct downgrader as incorrect (thereby suffering a false positive), but not vice versa.

If the downgrader is a sanitizer, for example, the downgrader accepts a string and modifies it to make it safe for use by one or more subsequent security-sensitive operations and thus, the modified string is the safe string "returned" by the downgrader. If the downgrader is a validator, the validator returns a Boolean value indicating whether the string is valid or not, which is what is meant by the terms "accepting" or "rejecting" a string. Thus, with a validator, the safe approximation of the set of strings that may be accepted by the downgrader is computed by the downgrader flaw/incompatibility detection engine 370.

Thus, the downgrader flaw/incompatibility detection engine 370 may determine that for an input string pattern S, a downgrader of a particular type implemented in a particular environment will generate a particular valid output O if it is operating correctly and is compatible with the particular environment. This can be done for each input string pattern S of interest, and for each combination of downgrader type and deployment environment. The resulting sets of legal string patterns for the various combinations of downgrader type and environment may be stored in the legal/illegal string pattern database 380. As an example, assume that the downgrader accepts a string S, and—if the string is up to length 5—pads the string with a sequence of 5 '$' (space) characters. The downgrader may use the following approximation for the return value: S→S($)*. That is, the return string can be the input string S followed by a sequence of 0 or more $ characters. This describes a set of strings that is a strict superset of the strings that may be returned by the downgrader.

Using the type of the downgrader, the environment context specification 390, and the legal/illegal string patterns in the legal/illegal string pattern database 380, the downgrader flaw/incompatibility detection engine 370 may determine whether a particular downgrader is flawed or otherwise incompatible with the environment in which it is deployed or is going to be deployed. A notification as to any flaws/incompatibility of the downgrader may then be generated by the downgrader flaw/incompatibility detection engine 370 and sent to an appropriate person's computing device via the I/O interface 320 so as to inform them of the flaw/incompatibility and the need to modify the downgrader to rectify the flaw or incompatibility.

As outlined above, the correctness of a downgrader is typically not an absolute judgment but rather a relative judgment relying on the context in which the downgrader serves, i.e. the environment in which the downgrader is deployed or is intended to be deployed. For example, an environment context specification 390 may be submitted to the downgrader flaw/incompatibility detection engine 370 along with a request to validate the operation of a particular downgrader associated with the environment context specification 390. The environment context specification 390 may specify, for example, a particular software configuration, hardware configuration, and/or the like, of the deployment environment of the downgrader. Based on the environment context specification 390 and the downgrader that is to be validated, the downgrader flaw/incompatibility detection engine 370 may determine the type of downgrader and the type of environment. Based on the type of downgrader and type of environment, corresponding sets of legal and illegal string patterns may be retrieved from the legal/illegal string pattern database 380.

In one illustrative embodiment, rather than storing the sets of legal string patterns in the legal/illegal string pattern database 380, the set of legal string patterns may be determined dynamically based on the particular input string being submitted to the downgrader and the type of downgrader and type of environment. That is, based on the type of downgrader and the type of environment, the downgrader flaw/incompatibility detection engine 370 may determine what illegal string patterns from the legal/illegal string pattern database 380 should be matched by the downgrader. From this information, the downgrader flaw/incompatibility detection engine 370 can determine that given a particular input string, a particular safe or valid output should be generated by a downgrader of the particular type in the particular type of environment if the downgrader is operating correctly and is compatible with the type of environment.

The output of the downgrader may then be compared to the set of legal string patterns to determine if there is a mismatch, i.e. for the particular input string, the output string comprises strings not in the set of legal string patterns. If so, then a determination may be made as to whether the string patterns included in the output of the downgrader are included in the set of illegal string patterns. From this, it can be determined which illegal string patterns the downgrader is matching and it can then be determined whether the illegal string patterns being matched by the downgrader are the correct ones for the environment that the downgrader is being deployed in or is already deployed in, i.e. whether the downgrader is compatible or incompatible with the deployment environment. Because downgrader code typically contains many conditional branches and loops, which are hard to track accurately, one cannot simply look at the downgrader code to determine the illegal string patterns the downgrader is matching. Hence, the illustrative embodiments provide a mechanism for determining what illegal string patterns are being matched by the downgrader without having to perform an exhaustive, complex, and error prone analysis of the downgrader code itself.

The comparison mentioned above, is performed by computing a regular expression serving as a safe approximation of (i) the sanitizer's return value, in the case of a sanitizer, or (ii) the set of strings accepted by a downgrader, in the case of a validator. Then, using standard techniques for comparing between regular expressions, the analysis classifies the downgrader according to its guidelines specification. For example, if the downgrader's approximation is regular expression R, and R is a subset of the regular expression for DB2 but not for the other database servers, then the downgrader is correct for an environment where DB2 is used. Information about the deployment environment then is used to determine whether there is a compatibility problem, i.e. the deployment environment matches one for which the regular expression is valid, e.g., if the regular expression is valid for DB2 and the deployment environment is DB2, then there is no compatibility problem but if the deployment environment is a different environment, then there is a compatibility problem.

Based on the determination as to compatibility or incompatibility above, a notification can be sent to an appropriate user's computing device indicating the compatibility or incompatibility. For example, a user initiating the analysis of the downgrader may have the results of the analysis returned to them via their computing device. The results of the analysis included in the notification may include not only an indication of whether the downgrader is compatible or incompatible, but also may determine an appropriate fix recommendation and may refer the user to more information on the problem. This fix recommendation and other information may be stored in a knowledge database (not shown) that is part of or associated with the application analysis mechanism 300 of the illustrative embodiments. For example, if the analysis performed by the illustrative embodiments determines that some end case was not handled correctly, then the database is consulted for a fix for that end case.

For example, consider the SQLi attack and the example set of illegal string patterns in the example previously mentioned above. With the mechanisms of the illustrative embodiments, based on the environment context specification 390 (e.g., the type of database server), the mechanisms of the illustrative embodiments determines which string patterns should be matched by the target downloader, i.e. the set of illegal string patterns discussed above. A string analysis is performed by the downgrader flaw/incompatibility detection engine 370 to compute a safe approximation of a set of string patterns that may be returned/accepted by the target downgrader. The safe approximation of the set of string patterns is compared with the set of illegal string patterns to determine which illegal string pattern(s) are matched by the safe approximation. The corresponding deployment environments associated with the matched illegal string patterns is then compared to the deployment environment, or intended deployment environment (as defined by the environment context specification 390), for the target downgrader to determine if the target downgrader is compatible with the environment identified in the environment context specification 390.

For example, if the database server specified in the environment context specification 390 is a Microsoft SQL server, and the first illegal string pattern, i.e. ".*('|\\x22|\\#|%|=|;|\\+|[cC][hH][aA][rR]\\s*\\(\\s*\\d+\\s*\\)).*", is matched rather than the second pattern, i.e. ".*('|\\x22|--|%|=|;|\\+|[cC][hH][aA][rR]\\s*\\(\\s*\\d+\\s*\\)).*", which is the correct illegal string pattern for matching by the downgrader for a MS SQL server environment, then the downgrader flaw/incompatibility detection engine 370 identifies the incompatibility issue indicating that the downgrader is operating under the assumption that a different type of database server is being used. The downgrader flaw/incompatibility detection engine 370 may further determine a recommendation for rectifying the identified incompatibility. This information, as well as references to other sources of information for resolving the incompatibility problem may be sent to an appropriate user in a notification via one or more computing devices.

In addition to identifying downgrader incompatibility issues with the deployment environments in which they are deployed, the downgrader flaw/incompatibility detection engine 370 may further detect the effectiveness of downgraders that may be determined to be compatible with their deployment environment and not flawed. This detection of the effectiveness of downgraders that are compatible with the deployment environment and not flawed may be performed in conjunction with or separately from the identification of the downgrader incompatibility issues described above. That is, it is not necessary for the identification of downgrader incompatibility issues to be performed as a precursor to the detection of the effectiveness of the downgraders.

The effectiveness of downgraders may be determined by identifying various strength levels of illegal string patterns that the downgrader may correctly match within the identified deployment environment as specified by the environment context specification 390. The strength of the illegal string patterns may be a measure of how complete the downgrader operation is with regard to illegal string patterns where a strong illegal pattern may be indicative of a complete downgrader operation, while a weaker illegal pattern is indicative a partially complete downgrader operation. Various levels of completeness, or strength, can thus be defined and identified using the mechanisms of the illustrative embodiments.

For example, the legal/illegal string pattern database 380 may store, in association with each type of deployment environment and each type of downgrader, a set of a plurality of illegal string patterns that may be matched by the downgrader, each illegal string pattern having an associated strength value. For example, assume that for a particular deployment environment, e.g. MS SQL server, a SQLi downgrader for that deployment environment may match any of the following three illegal string patterns:

```
".*('|\\x22|\\#|%|=|;|\\+|[cC][hH][aA][rR]|\\s*\\(\\s*\\d+\\s*\\)).*" // STRONG
".*('|\\x22|\\#|%|=|;|\\+).*" // WEAKER
".*(\\#|%|=|;|\\+).*" // WEAKEST
```

The downgrader flaw/incompatibility detection engine 370 may determine whether the target downgrader only outputs strings that meet the requirements of the first illegal string pattern. If so, the downgrader is not incompatible with the deployment environment and also implements a strong enforcement against SQLi attacks. If, however, the downgrader outputs strings that are in conformance with the second illegal string pattern above, but not the first illegal string pattern, i.e. the downgrader outputs strings including string patterns that are in the first illegal string pattern but not in the second illegal string pattern, then it can be determined that the effectiveness of the downgrader is relatively weaker than it should be. The downgrader flaw/incompatibility detection engine 370 may return to the user, such as in the notification generated after determining whether a target downgrader is flawed/incompatible with the deployment environment, an indication of the strength of the downgrader with regard to the attacks against which the downgrader is protecting the backend system. The downgrader flaw/incompatibility detection engine 370 may further determine recommended resolutions for detected weakness in the protection being afforded by the downgrader. For example, if it is determined that the downgrader matches only the second illegal string pattern, then the recommendation may be to modify the downgrader to implement matching the first illegal string pattern. Moreover, the downgrader may be strengthened by having it operate correctly in more deployment environments, e.g., if the downgrader is operating correctly for only one deployment environment, the downgrader itself could be extended to support more deployment environments, e.g., more database server types.

Thus, the illustrative embodiments can determine whether a downgrader is flawed or is incompatible with the deployment environment in which it is deployed or is to be deployed and may further determine a strength of protection being afforded by downgraders that are compatible, or even incompatible, with the deployment environment. These can be done separate or in conjunction with one another. For example, a downgrader may be incorrect for the deployment environment in more than one way. For example, a SQLi downgrader may be incompatible with the backend database server but may also be determined to conform only to relatively weaker illegal string patterns. The mechanisms of the illustrative embodiments can detect the incorrectness of the downgrader along both "axes", i.e. the compatibility axis and the strength axis.

FIG. 9 is a flowchart outlining an example operation for determining flaws/incompatibility of downgraders in accordance with one illustrative embodiment. The operation outlined in FIG. 9 may be implemented, for example, by the application analysis mechanism 300 in FIG. 3, for example.

As shown in FIG. 9, the operation starts by receiving application code (step 910) and identifying downgrader code in the application code (step 920). These operations can be performed, for example, by the downgrader detection engine 330 in FIG. 3 for example. The remaining operations may be performed, for example, by the downgrader flaw/incompatibility detection engine 370 in FIG. 3. The environment context specification for the identified downgrader code is received/determined (step 930). As mentioned above, the environment context specification may be user specified or may be determined by examining the deployment environment in which the identified downgrader code is deployed or intended to be deployed.

Thereafter, for a next downgrader in the identified downgrader code, a safe approximation of the set of valid downgrader output string patterns for a set of one or more input strings is obtained (step 940). This set of valid downgrader output string patterns may be determined dynamically based on a particular input string input or may be retrieved from a storage device/system that stores the legal (valid) downgrader string patterns for the particular type of downgrader that is being evaluated. A set of illegal string patterns for the particular downgrader being evaluated is also retrieved from an illegal string pattern storage device/system (step 950). The safe set of valid output string patterns, the set of illegal string patterns, and the environment context specification are compared (step 960). A determination as to compatibility of the downgrader with the deployment environment and a relative strength of the protection afforded by the downgrader is determined (step 970). Based on this determination, an appropriate notification is generated an output to an authorized user (step 980). A determination is then made as to whether there are more downgraders to be evaluated (step 990). If so, the operation returns to step 940; otherwise the operation terminates.

Thus, the illustrative embodiments provide mechanisms for identifying downgraders in application code and evaluating the downgraders as to whether they are flawed or incompatible with the deployment environment in which the downgrader is deployed or is to be deployed. Moreover, the illustrative embodiments provide mechanisms for determining a relative strength of the protection afforded by the downgrader. Notifications containing results of these evaluations may be generated which may optionally include recommendations as to how to make the downgrader compatible with the deployment environment and/or increase the strength of the protection afforded by the downgrader. As a result, users are informed of downgrader incompatibility and how to rectify such incompatibilities to ensure optimum implementation of downgraders with their deployment environments.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for evaluating downgrader code in application code with regard to a target deployment environment, comprising:
    identifying, by an application analysis mechanism of the data processing system, the downgrader code in the application code, wherein the downgrader code is a portion of code in the application code that operates on an information flow of the application code to ensure confidentiality of information input to the downgrader code, in the output of the downgrader code;
    generating, by the application analysis mechanism, based on an input string, an output string that the downgrader code outputs in response to receiving the input string;
    retrieving, from a storage system associated with the data processing system, one or more sets of illegal string patterns, wherein each of the one or more sets of illegal string patterns is associated with a corresponding deployment environment, and wherein the illegal string patterns are string patterns that a downgrader identifies in the information flow for security purposes;
    determining, by the application analysis mechanism, whether the downgrader code is compatible with the target deployment environment based on the one or more sets of illegal string patterns and the output string; and
    generating, by the application analysis mechanism, an output indicative of the results of the determining.

2. The method of claim 1, wherein determining whether the downgrader code is compatible with the deployment environment comprises:
    identifying the target deployment environment in which the downgrader code is deployed or is to be deployed; and
    determining whether the downgrader code is compatible with the deployment environment based on the one or more sets of illegal string patterns, the output string, and the identification of the target deployment environment.

3. The method of claim 2, wherein identifying the target deployment environment comprises receiving a user specification of the target deployment environment.

4. The method of claim 2, wherein identifying the target deployment environment comprises automatically determining the target deployment environment based on an analysis of configuration information maintained by the data processing system.

5. The method of claim 1, wherein determining whether the downgrader code is compatible with the target deployment environment comprises:
    comparing the output string of the downgrader code to the one or more sets of illegal string patterns; and
    identifying an illegal string pattern, in the one or more sets of illegal string patterns, that the output string of the downgrader code matches.

6. The method of claim 5, wherein determining whether the downgrader code is compatible with the target deployment environment comprises:
    identifying a corresponding deployment environment associated with the illegal string pattern that the output string of the downgrader code matches; and
    determining if the corresponding deployment environment matches the target deployment environment, wherein if the corresponding deployment environment matches the target deployment environment, it is determined that the downgrader code is compatible with the target deployment environment, and wherein if the corresponding deployment environment does not match the target deployment environment, it is determined that the downgrader code is not compatible with the target deployment environment.

7. The method of claim 5, further comprising:
    determining a strength of the illegal string pattern that the output string of the downgrader code matches;
    determining if a higher strength illegal string pattern exists in the one or more sets of illegal string patterns for the target deployment environment; and
    generating, in response to a determination that there is a higher strength illegal string pattern, a recommendation as to how to improve the operation of the downgrader code so that the output string of the downgrader code will match the higher strength illegal string pattern.

8. The method of claim 7, wherein the output comprises a notification transmitted to a user, wherein the notification identifies whether the downgrader code is compatible with the target deployment environment and further identifies the recommendation.

9. The method of claim 1, wherein the data processing system stores a plurality of illegal string patterns, wherein each set of illegal string patterns, in the plurality of illegal string patterns, is associated with a type of downgrader code, and wherein retrieving one or more sets of illegal string patterns is performed based on a type of the identified downgrader code in the application code.

10. The method of claim 1, wherein:
the one or more sets of illegal string patterns are retrieved from an illegal string database that stores a plurality of illegal string patterns associated with corresponding deployment environments,
each of the one or more sets of illegal string patterns is, in the illegal string database, associated with a corresponding deployment environment, wherein the deployment environment is defined by at least one of a configuration of software executing in the deployment environment or hardware used in the deployment environment, and
at least two illegal string patterns in the illegal string database are associated with different deployment environments.

11. The method of claim 1, wherein the downgrader code comprises at least one of a validator or a sanitizer, wherein the validator is a portion of code that analyzes input data and either accepts or rejects the input data, and wherein the sanitizer is a portion of code that analyzes input data and modifies suspect portions of the input data.

* * * * *